US006073841A

United States Patent [19]
Walton

[11] Patent Number: 6,073,841
[45] Date of Patent: Jun. 13, 2000

[54] SYSTEM AND METHOD OF TRACKING CONTINUING EDUCATION INFORMATION USING SECURE STORED DATA DEVICES

[75] Inventor: Jane B. Walton, Austin, Tex.

[73] Assignee: Schlumberger Technologies, Inc., Del.

[21] Appl. No.: 09/046,957

[22] Filed: Mar. 24, 1998

Related U.S. Application Data

[60] Provisional application No. 60/041,103, Mar. 24, 1997.

[51] Int. Cl.$^7$ ....................................................... G06K 5/00
[52] U.S. Cl. ............................. 235/382; 235/375; 235/380
[58] Field of Search ..................................... 235/375, 380, 235/382, 382.5, 487, 492; 705/7, 9

[56] References Cited

U.S. PATENT DOCUMENTS

| | | | |
|---|---|---|---|
| 4,868,376 | 9/1989 | Lessin et al. | 235/492 |
| 4,993,068 | 2/1991 | Piosenka et al. | 235/380 X |
| 5,053,956 | 10/1991 | Donald et al. | 713/601 |
| 5,717,776 | 2/1998 | Watanabe | 235/380 X |
| 5,932,869 | 8/1999 | Gottlich et al. | 235/380 X |
| 5,965,860 | 11/1999 | Oneda | 235/382 |
| 5,979,773 | 11/1999 | Findley, Jr. et al. | 235/492 |

FOREIGN PATENT DOCUMENTS

| | | |
|---|---|---|
| 0 658 862 | 6/1995 | European Pat. Off. . |
| 2 254 462 | 10/1992 | United Kingdom . |

*Primary Examiner*—Donald Hajec
*Assistant Examiner*—Jared J. Fureman
*Attorney, Agent, or Firm*—Danita J. M. Maseles; Pehr B. Jansson

[57] ABSTRACT

A system for tracking continuing education includes a secure stored data device, such as a smart card, storing practitioner-specific data, and a read/write device for communicating with the secure stored data device and for writing course attendance information for the practitioner to the secure stored data device. A professional education server initiates the secure stored data device and the read/write device, accepts data from the secure stored data device and the read/write device, verifies compliance with education requirements and verifies consistency in the data sets.

28 Claims, 11 Drawing Sheets

SYSTEM AND METHOD OF TRACKING CONTINUING EDUCATION INFORMATION USING SECURE STORED DATA DEVICES

Under 35 U.S.C. § 119 (e), this application claims benefit of prior U.S. provisional application Ser. No. 60/041,103, filed Mar. 24, 1997.

TECHNICAL FIELD

This invention relates in general to the field of tracking continuing education information, and more particularly to an improved system and method of tracking continuing education information, using secure stored data devices (SSDDs).

BACKGROUND OF THE INVENTION

Many of the professions and trades, for example physicians, certified public accountants, attorneys, chiropractors, architects, plumbers and electricians and the like, require individual practitioners to acquire and maintain a license. In the United States, license rules for such professions and trades are typically regulated by professional licensing organizations within the state. (The phrase "professional licensing organization" is used throughout to refer both to organizations for those in "professions" and those in "trades.") There may also be some federal regulation. In other countries, licensing agencies may be either regional or national. Typically, regulations require practitioners in the profession or trade to complete annual reports of continuing education study undertaken to retain their licenses. In the United States, these requirements may vary from state to state, but often state licensing agencies participate in a national organization and attempt to create uniform continuing educational requirements. Further, most state professional licensing organizations certify vendors that are permitted to offer continuing education to their members, and may even certify particular courses of study offered by the vendors.

Currently, many professional licensing organizations require the practitioner to maintain an individual record-keeping system for continuing education. At a minimum, the system must track the number of hours spent in the training session, the course title and the sponsoring vendor. Other requirements may be imposed, for example course categories, course numbers, sponsor numbers or course location. The responsibility for devising a record-keeping method frequently falls on the practitioner. Even where it does not, the practitioner is at least required to verify that the information collected concerning his or her continuing education is correct. The accumulated information must be reported to and/or verified with the professional licensing organization, frequently on an annual basis and in a paper-based format, such as an attachment to a license renewal form specified by the professional licensing organization.

As mentioned above, many professional licensing organizations also certify vendors which offer conforming education to the practitioners. The details of certification vary widely among professions and locales. Vendors may be required to submit information to the professional licensing organization concerning courses offered, instructors, and materials used for the courses. To maintain certification, vendors are also often required to submit information concerning course attendance to the professional licensing organization and/or to maintain this information to accommodate auditing by the professional licensing organization.

The purpose of tracking continuing education information is to ensure that educational requirements are met by each practitioner. Therefore, much of the professional licensing organization's efforts are concentrated upon receiving, recording, sorting, auditing and storing paper-based records of such information. In current systems, much of the information received is paper-based. Recording and sorting the information may include manual transcription to a computer-based environment. Auditing must include verification that the required hours are reported. Auditing might also include comparing a sample of the practitioner's data with the vendor's data, validating the existence of the course, the duration and evidence of attendance at a minimum.

Because the practitioners are geographically dispersed and frequently travel to undergo training, and because many professional licensing organizations are regional, vendors are also geographically scattered. An automated system for administrating, recording and reporting ("tracking") fulfillment of continuing education requirements is impractical without a way of accommodating this dispersion.

A disadvantage of the current systems for tracking continuing education information is the burden of creating, accumulating and storing numerous paper documents.

Another disadvantage of the current systems for tracking continuing education information is the error and inefficiency which can arise from manual entry of data either into a computer database or into some other record-keeping system.

Another disadvantage of the current systems for tracking continuing education information is the absence of mechanisms for verifying actual attendance.

A further disadvantage of the current systems for tracking continuing education information is the absence of mechanisms for comparing and identifying discrepancies in information submitted by attendees with information submitted by vendors taking attendance.

Yet another disadvantage of the current systems for tracking continuing education information is the error, inefficiency and burden which can arise from manual record-keeping by the practitioner.

Accordingly, there is a need for a system which automatically tracks continuing education and which does not rely on paper record-keeping.

There is a need for a system which automatically tracks continuing education, while minimizing error arising from manual entry of data.

There is a need for a system which tracks continuing education which will also authenticate the identity of the practitioner attending the course of study.

Further, there is a need for a system which automatically tracks continuing education which will transmit the data to the professional licensing organization in a form that facilitates its use.

There is also a need for a vendor data recording and storage mechanism capable of authenticating the practitioner's identity, of collecting data that meets the professional licensing organization's requirements and of transmitting the data to the professional licensing organization.

There is a need for a system to track continuing education, without placing a burden on the practitioner, while protecting the privacy of the practitioner.

There is a need for a system to track continuing education which prohibits tampering with recorded data.

There is also a need for a system to track continuing education which identifies exceptions to compliance with the professional licensing organization's education requirements.

There is a further need for a system to track continuing education which identifies exceptions to data consistency between practitioner's data and vendor's data.

There is also a need for a system to track continuing education which can maintain individualized real time data of geographically dispersed practitioners and vendors.

There is also a need for a system to track continuing education which can accumulate data on frequency of course attendance within licensing jurisdictions in order to plan future course offerings.

SUMMARY OF THE INVENTION

In accordance with the present invention, a continuing education tracking system and method is provided that substantially reduces the disadvantages associated with previously developed reporting systems.

In one aspect the invention is a system for tracking continuing education for a practitioner. Such a system comprises a secure stored data device (SSDD) having practitioner-specific data written on the SSDD, a first read/write device (RWD) for communicating with the SSDD and for writing course attendance information to the SSDD, and a continuing education server (PES). The RWD is initialized with authenticated vendor information from the PES to show that the vendor is authorized by a professional licensing organization to provide continuing education courses. The RWD is populated with approved course information. The SSDD is operable to obtain certification information from the RWD and is operable to confirm that continuing education courses are certified by a professional licensing organization.

The SSDD of the present invention may be a smart card, specifically a multi-application smart card.

The continuing education server (PES) of the invention may have a means to receive and accumulate the continuing education information from the SSDD and from the first RWD. A system according to the invention may also comprise a second RWD associated with the PES which can communicate with the SSDD.

The system of the present invention may further include identity verification. Such verification may be included in the practitioner-specific information. It may include a password, a personal identification number, a digitized signature, digitized biometric information, a digitized fingerprint, or a digitized retinal pattern.

The continuing education tracking system of the invention may further comprise a first interface unit (IU) having a RWD for communicating with the SSDD. The RWD having a first display device and having means to compile continuing education reports and display the continuing education reports on the first display device. Further the continuing education tracking system may have a second IU which communicates with the first RWD, having a second display device and having means to compile continuing education reports and display the continuing education reports on the second display device.

In one embodiment of the invention, the PES has means to compare course attendance information received from the first RWD to course attendance information received from the SSDD to determine whether there are any inconsistencies. In another embodiment of the invention the PES has means to analyze course attendance information for the practitioner to determine whether the practitioner has met course education requirements of a professional licensing organization.

In another aspect, the invention is a system for tracking continuing education of a practitioner. In that aspect the system may comprise a secure stored data device (SSDD) having practitioner-specific data written on the SSDD, the practitioner-specific data including identity verification information and good standing information; a first read/write device (RWD) of a vendor for communicating with the SSDD, for writing course attendance information to the SSDD, the first RWD having an identity verification input and having approved course information including information indicating that the vendor is authorized by a professional licensing organization to provide continuing education courses; a continuing education server (PES) having means to receive and accumulate the practitioner's continuing education information obtained from the SSDD and from the first RWD and having a second RWD which can communicate with the SSDD; a first interface unit (IU) having a third RWD for communicating with the SSDD, having a first display device and having means to compile continuing education reports and display the continuing education reports on the first display device, and having a means to communicate with the PES; and a second IU which communicates with the first RWD, having a second display device and having means to compile continuing education reports and display the continuing education reports on the second display device, having a means to communicate with the PES. The first RWD obtains the information indicating that the vendor is authorized by a professional licensing organization to provide continuing education courses and approved course information from the PES.

In that aspect of the invention, the PES may have means to analyze the course attendance information for the practitioner to determine whether the practitioner has met the course education requirements of the professional licensing organization. Furthermore, the PES may have means to compare course attendance information received from the first RWD to course attendance information received from the SSDD to determine whether there are any inconsistencies.

The SSSD may be a multi-application smart card and an application on the card may be a loyalty application, a payment application, or a professional benefits application.

In a third aspect, the invention is a method for tracking continuing education for a practitioner. The method may include initiating a first read/write device (RWD) of a vendor using a continuing education server (PES), with authenticated vendor information to show that the vendor is authorized by a professional licensing organization to provide continuing education courses; initiating a secure stored data device (SSDD) with practitioner-specific information using a second RWD associated with the PES and authenticating the SSDD; populating the first RWD with approved course information; submitting the SSDD to the first RWD; obtaining authorization to write course attendance information from the RWD to the SSDD; writing course attendance information for the practitioner to the SSDD using the first RWD; storing course attendance information for a practitioner on the first RWD and transmitting the course attendance information from the first RWD to a PES; transferring course attendance information for a practitioner from the SSDD to a PES through the second RWD associated with the PES; using the PES to analyze course attendance information for the practitioner to determine whether the practitioner has complied with continuing education requirements of the professional licensing organization; and analyzing course attendance information received from the SSDD and course attendance information for the practitioner received from the first RWD using the PES to determine whether there are any inconsistencies. The step of obtaining authorization to write course attendance information from the RWD to the SSDD including: obtaining appropriate practitioner input into an identity verification unit of the first RWD; reading the practitioner input with the first RWD and reading practitioner-specific information from the SSDD with the first RWD; comparing the practitioner input to the practitioner-specific information using the first RWD, to confirm the identity of the practitioner; confirming that the continuing education course is certified by the professional licensing organization by using the SSDD to obtain certification information from the first RWD; and confirming that the practitioner is in good standing with the professional licensing organization by using the first RWD to obtain certification from the SSDD.

In the method of the invention, the SSDD may be a multi-application smart card and the method may include the step of writing loyalty points to the smart card, using the smart card to make a payment, or ascertaining the practitioner's eligibility for professional benefits from the smart card.

An advantage of the present invention is that it provides for a system and a method of automatically tracking continuing education which does not rely on paper recordkeeping.

Another advantage of the present invention is that it provides for a system and a method of automatically tracking continuing education, while minimizing error arising from manual entry of data.

Another advantage of the present invention is that it provides for a system and a method of automatically tracking continuing education which will also authenticate the identity of the practitioner attending the course of study.

Another advantage of the present invention is that it provides for a system and a method of automatically tracking continuing education which will transmit the data to the professional licensing organization in a form that facilitates its use.

Another advantage of the present invention is that it provides for a vendor data recording and storage mechanism capable of authenticating the practitioner's identity, of collecting data that meets the professional licensing organization's requirements and of transmitting the data to the professional licensing organization.

Another advantage of the present invention is that it provides for a system and a method of automatically tracking continuing education which does not place a burden on the practitioner, but protects the privacy of the practitioner.

Another advantage of the present invention is that it provides for a system and a method of automatically tracking continuing education which prohibits tampering with recorded data.

Another advantage of the present invention is that it provides for a system and a method of automatically tracking continuing education which identifies exceptions to compliance with the professional licensing organization's education requirements.

Another advantage of the present invention is that it provides for a system and a method of automatically tracking continuing education which identifies exceptions to data consistency between practitioner's data and vendor's data.

Another advantage of the present invention is that it provides for a system and a method of automatically tracking continuing education which can maintain individualized real time data of geographically dispersed practitioners and vendors.

Another advantage of the present invention is that it provides for a system and a method of automatically tracking continuing education which can accumulate data on frequency of course attendance within licensing jurisdictions in order to plan future course offerings.

DESCRIPTION OF THE PREFERRED EMBODIMENT

Figure 1:
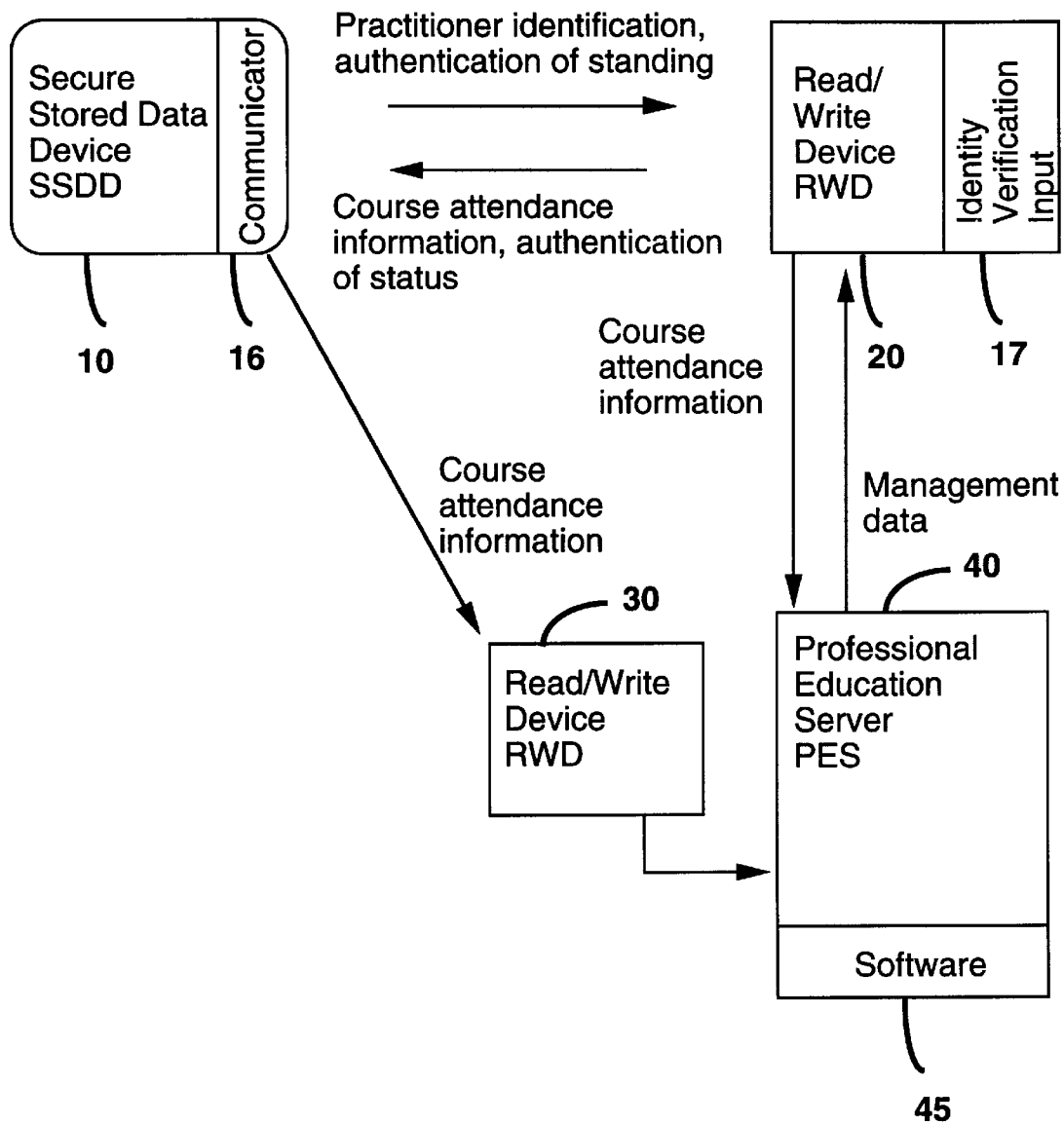
FIG. 1 is a block diagram illustrating a continuing education reporting system in accordance with a preferred embodiment of the present invention.

The above-noted and other aspects of the present invention will become more apparent from a description of the preferred embodiment, when read in conjunction with the accompanying drawings. The drawings illustrate the preferred embodiment of the invention. In the drawings, the same members have the same reference numerals.

1. System for Tracking Continuing Education

A system for tracking continuing education information using a Secured Stored Data Device ("SSDD") is illustrated in FIG. 1. The SSDD 10 could take one of a number of forms, including but not limited to an integrated circuit card (also known as a "smart card"), a Personal Digital Assistant ("PDA") or an electronic purse or wallet. The SSDD 10 has a microcontroller or some other electronic device which has a memory for storing software and/or data. The memory in the SSDD 10 stores information specific to the practitioner (practitioner-specific data), such as name, address, license number, organization member number, specialties and membership in a professional licensing organization. The SSDD 10 also stores information concerning the practitioner's attendance in or completion of continuing education courses ("course attendance information"). The SSDD 10 is preferably portable, so that the SSDD 10 can be carried by the professional when attending continuing education courses in various locations, whether in physical locations or in remote learning systems such as the Internet. An advantage of the SSDD 10 is that it is possible for the SSDD 10 to support multiple applications. The SSDD 10, as is known in the art, has inherent security which prohibits unauthorized tampering with information stored on the SSDD 10.

Figure 2A:
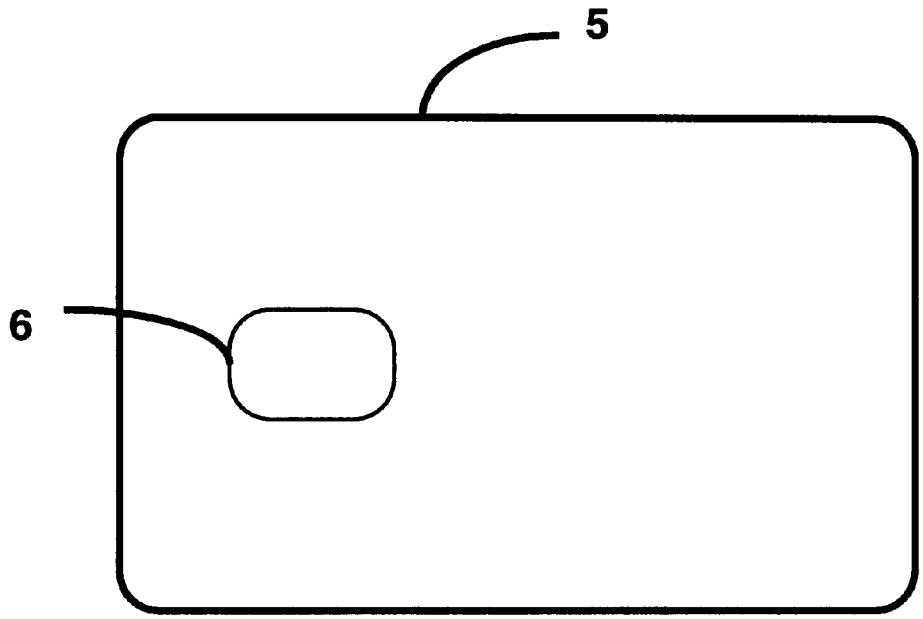
FIGS. 2A and 2B are block diagrams illustrating a smart card SSDD and its microcontroller in accordance with a preferred embodiment of the present invention.
Figure 2B:
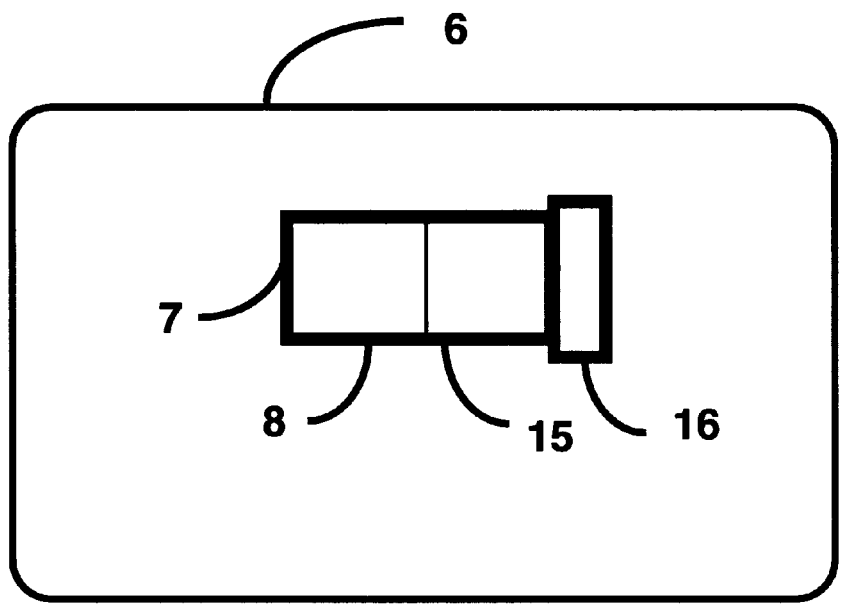

A smart card 5 SSDD in accordance with the present invention is illustrated in FIGS. 2A and 2B. The smart card 5 has a microcontroller 6 with a memory 7, with a data storage 8 for practitioner-specific data and other information. The memory 7 also stores software 15. The memory 7 in the microcontroller 6 is connected to a communicator 16. Schlumberger's Cyberflex™ card is an example of such a multi-application smart card 5 SSDD.

As illustrated in FIG. 1, the SSDD 10 (if a smart card 5 through its communicator 16, see FIG. 2B) communicates with a read/write device ("RWD") 20. The RWD 20 may take any form able to interface with a SSDD. For example, for a smart card 5 SSDD, the RWD 20 may be a smart card reader, which includes reader software. The interaction between the SSDD 10 and the RWD 20 could take place through physical insertion of the SSDD 10 into the RWD 20 ("contact") or could be contact-less, interacting through radio frequency, optic or infrared transmission or any other reliable transmission mechanism. The RWD 20 may also communicate with a continuing education server ("PES") 40.

In the embodiment illustrated in FIG. 1, the SSDD 10 is used by the professional licensing organization as the membership card for the practitioner. For the legal profession, for example, the SSDD 10 could be used as the attorney's state bar card. Accordingly, in this embodiment, the SSDD 10 has identity verification capabilities. To verify identity, the SSDD 10 stores a Personal Identification Number (PIN) of the practitioner in its memory. The RWD 20 may include an identity verification input 17 or the identity verification input 17 may be present as a separate element. The practitioner would have to key in the correct PIN number into the identity verification input 17 in order to use the SSDD 10. In other embodiments of the invention, alternatively or in addition to the PIN, the SSDD 10 carries digitized signature information or digitized biometric information about the practitioner, such as a digitized fingerprint or retinal pattern or other information used to verify identity of the practitioner. The SSDD 10 could also have a picture of the practitioner printed on its surface.

The SSDD 10 and the RWD 20 exchange identification and authentication information which authorizes the transfer of continuing education course information from the RWD 20 to the SSDD 10. The RWD 20 sends an identity query to the SSDD 10 to initiate the process. The practitioner supplies appropriate input to the identity verification input 17 and the SSDD 10 sends identity information to the RWD 20. The RWD 20 compares the input to the identity information and confirms the identity of the practitioner. In addition to the identity of the practitioner, the authentication of practitioner's good standing in the professional licensing organization may similarly be established. Good standing may include whether the practitioner has paid the appropriate license fee, any state professional license tax and whether the practitioner is clear of any ethical violations forbidden by the professional licensing organization ("standing information"). The standing information may be stored on the SSDD 10 or may be available to the RWD 20 via communication with the PES 40, and may be in the form of a authentication code. In addition, the SSDD 10 may store other information about the practitioner, such as specialties, membership in special groups of the professional licensing organization or board certifications ("specialty information").

After identity verification, information concerning the continuing education course the practitioner is attending or has completed ("course attendance information"), which may include authentication information concerning the certification of the vendor, is downloaded from the RWD 20 to the SSDD 10, where the course attendance information is then stored. In the preferred embodiment illustrated in FIG. 1, the RWD 20 also transmits course attendance information for the practitioners attending that course to the PES 40. In addition, the RWD 20, or a second RWD 30 associated with the PES 40, can upload stored course attendance information from the SSDD 10 to the PES 40.

The PES 40 comprises a computer server or network server having PES software 45 which can process and store data. The PES 40 stores and tracks accumulated course attendance information and maintains the records needed for verifying the practitioner's compliance with the professional licensing organization's requirements. The PES software 45 verifies whether the practitioner (or the vendors) has reported sufficient course attendance information for the practitioner to meet the requirements of the professional licensing organization. The PES 40 also maintains records concerning the practitioner's standing information or specialty information. In the preferred embodiment, the PES 40 also enables comparison of course attendance information uploaded from a practitioner's SSDD 10 to course attendance information collected concerning the practitioner during the year from the RWD 20 or from a plurality of RWD's operated by one or a plurality of vendors, to ascertain whether there are discrepancies in the information (audit function). The PES 40 also performs calculations on the course attendance information collected for each practitioner to assess whether the practitioner has met the requirements of the professional licensing organization (compliance function). The PES 40 also determines whether the courses of study undertaken by the practitioner are those that the professional licensing organization has certified. The PES 40 also accumulates information about numbers of practitioners attending various types of courses ("management data"). The PES 40 transmits the management data to RWD 20. The management data is useful to vendors and to the professional licensing organization in determining which courses to offer in the future.

Figure 3:
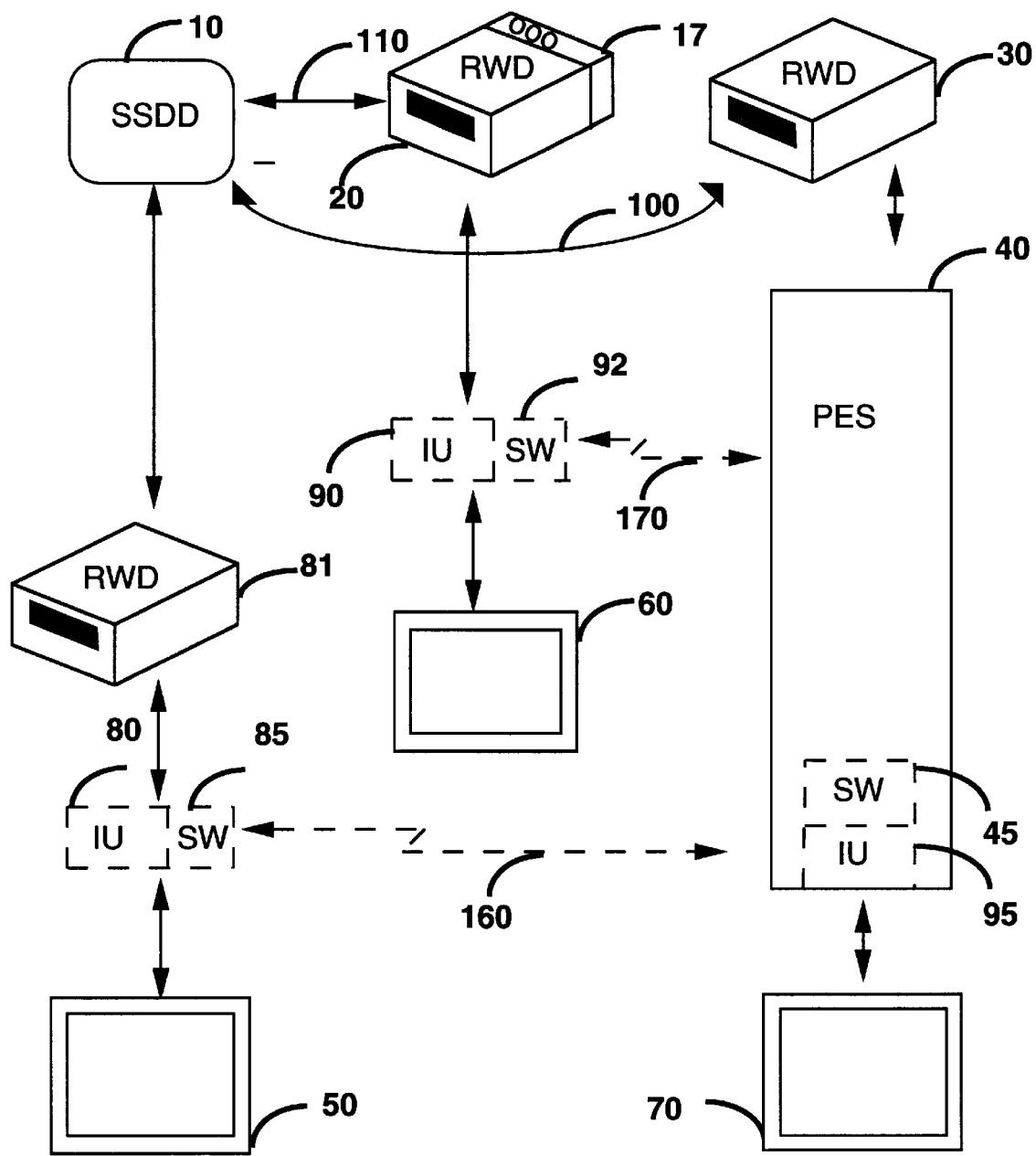
FIG. 3 is a block diagram illustrating the system elements and communication pathways of a continuing education reporting system in accordance with a preferred embodiment of a preferred embodiment of the present invention.

FIG. 3 illustrates communication between elements in a preferred embodiment of the invention. The SSDD 10 interacts with the RWD 20 via a communication path 110 that may be a physical connection such as a mechanical connection (insertion) or an electrical connection (cable) or a connection through radio frequency or infrared transmission or any other reliable transmission mechanism. Similarly the SSDD 10 can interact with the second RWD 30 via a communication path 100, which can be a direct contact such as a mechanical connection (insertion) an electrical connection (cable) or through radio frequency or infrared transmission or any other reliable transmission mechanism. In this embodiment, the RWD 20 is operated by the vendor while the RWD 30 is operated by the professional licensing organization or its designee.

As previously described with reference to FIG. 1, in the preferred embodiment of the invention illustrated by FIG. 3, the SSDD 10 and the RWD 20 exchange identification and authentication information which authorizes the transfer of continuing education course information from the RWD 20 to the SSDD 10. The RWD 20 sends an identity query to the SSDD 10 to initiate the process. The practitioner supplies appropriate input to the identity verification input 17 and the SSDD 10 sends identity information to the RWD 20. The RWD 20 compares the input to the identity information and confirms the identity of the practitioner. In addition to the identity of the practitioner, the standing information and/or specialty information for the practitioner may also be exchanged and the good standing or authentication of the practitioner verified by the first RWD. The standing information and/or specialty information may be stored on the SSDD 10 or may be available to the RWD 20 via communication with the PES 40.

After identity verification, the course attendance information is downloaded from the RWD 20 to the SSDD 10, where the course attendance information is then stored. The course attendance information for the current course is added to information concerning other such courses that the practitioner has participated in during the current year. The RWD 20 also transmits course attendance information for the practitioner, along with such information for all other practitioners taking the course that day, to the PES 40.

At the end of the year, the practitioner may physically submit his or her SSDD 10 to the professional licensing organization. The professional licensing organization can have the SSDD 10 read by the second RWD 30, which can upload stored course attendance information from the SSDD 10 to the PES 40.

The SSDD 10 and RWD 20, as illustrated in FIG. 3, are used in conjunction with an Interface Unit ("IU") 80 and second IU 90, respectively, to generate electronic or tangible reports. The IU 80, 90 may each be a personal computer, a network computer, an interactive television, or other computing or communicating device, which is either incorporated with or connected to a display device 50, 60 for rending information into visual or audible form. The display device 50, 60 may be a computer screen, television screen, a printer or other mechanism for rendering a visual or an audible report, whether electronic or tangible. The first IU 80 has either a third RWD 81 connected to or incorporated into the first IU 80, to allow the IU 80 to communicate with the SSDD 10.

The first and second IUs 80, 90 may have first and second indirect interfaces 160, 170 respectively for communication with the PES 40. The first indirect interface 160 and the second indirect interface 170 may each be a telephone modem, a cellular modem satellite transmission capability, or Internet transmission capability. The first indirect interface 160 and the second indirect interface 170 permit communication between the PES 40, and, respectively, the first IU 80 and the second IU 90. The second RWD 30 is also connected to the PES 40.

Because the PES 40 is a server, the PES 40 inherently has a third IU 95, or a plurality of IUs, with associated third display device(s) 70, incorporated into the PSE 40.

Figure 4A:
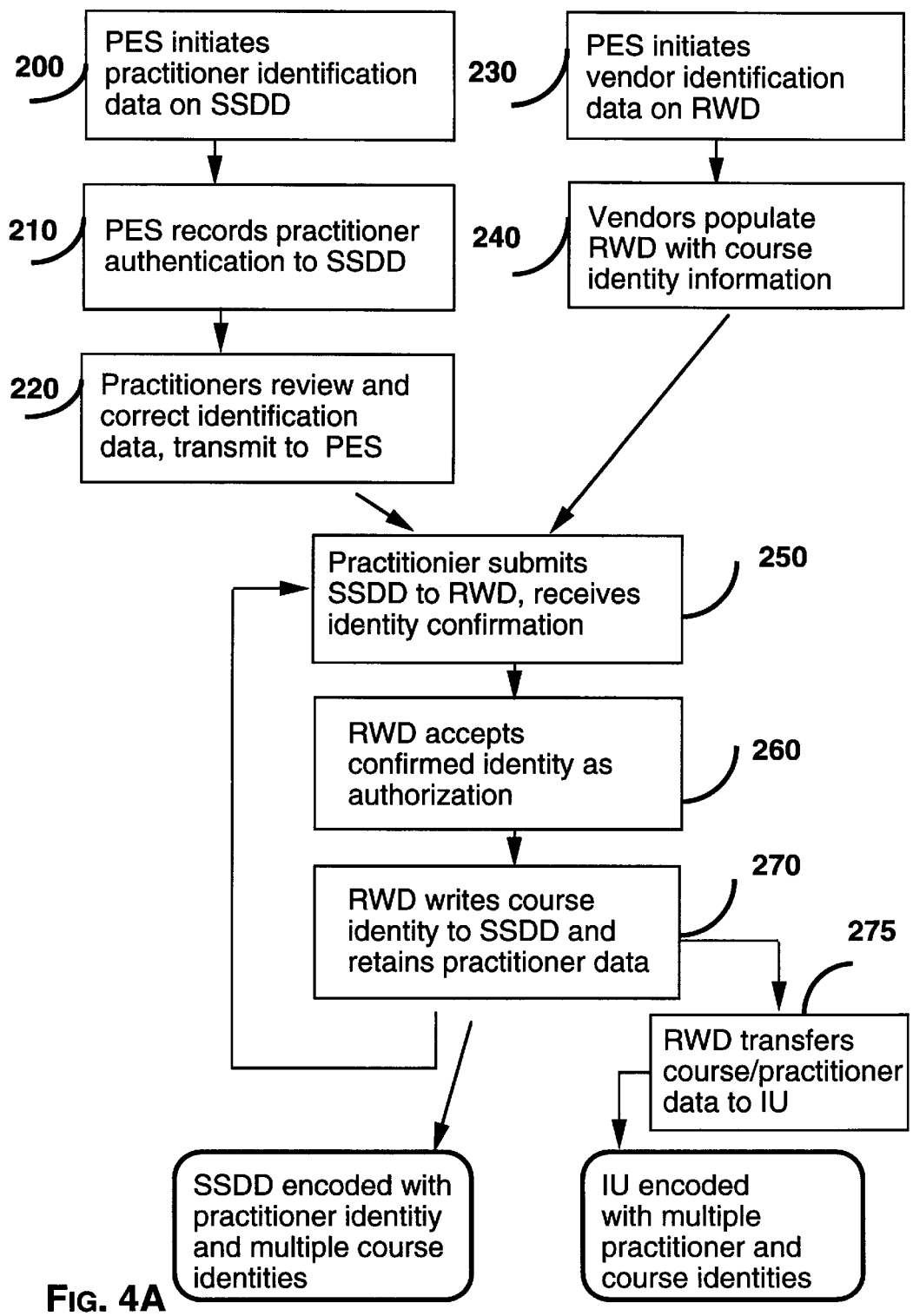
FIGS. 4A and 4B are flowcharts illustrating a continuing education reporting system in accordance with a preferred embodiment of the present invention.
Figure 4B:
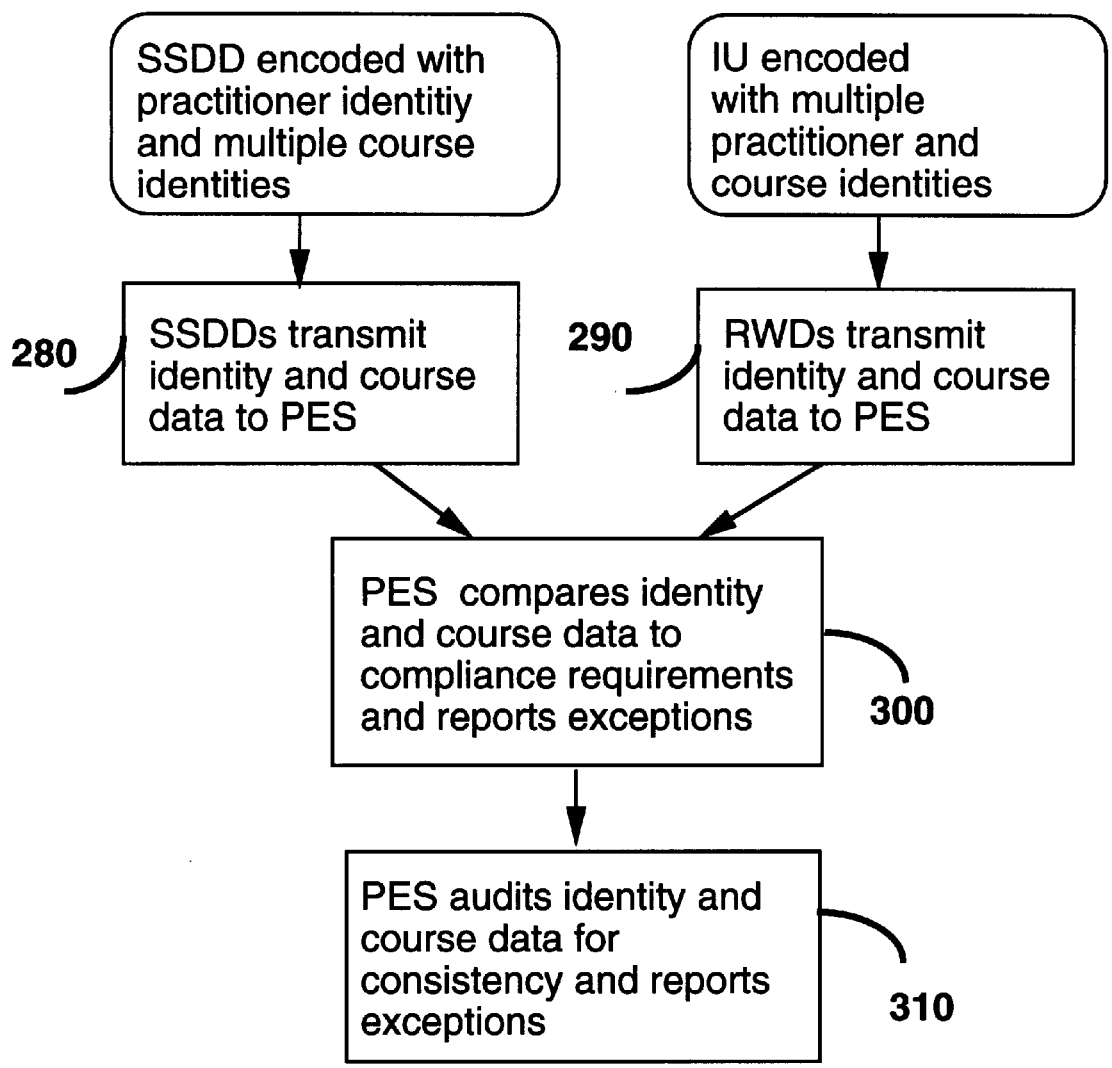

FIGS. 4A and 4B are flowcharts illustrating a continuing education reporting system in accordance with a preferred embodiment of the present invention. As illustrated by FIG. 4A, the professional licensing organization controls the authenticity of SSDD 10 held by practitioners by initiating 200 the practitioner-specific data on one or a plurality of SSDDs and distributing the SSDD(s) to the practioner(s). The practitioner specific data may include identity information, standing information, specialty information, membership number, as well as general information about the practitioner, such as her address, contact information, employer, etc. Some practitioner-specific data, such as address or employer, may require periodic update by the practitioner. Other information, such as a membership number, may be edit proof or read-only. If the practitioner is in good standing, as part of the initiation of the SSDD 10, the PES 40 authenticates the SSDD 210 by placing an authentication practioner code on the SSDD 10 which can be recognized by the RWD 20. The authentication practitioner code may be encrypted such that it can only be read by the RWD 20 of an authorized vendor who has been supplied with the key to the encrypted code. The practitioner uses her IU 80 to review 220 the information on the SSDD 10. If corrections are needed, the practitioner uses the IU 80 to either make changes 220 to the (editable) portion of the information on the SSDD 10 or to submit 220 changes to the PES 40, which would use its RWD 30 to put the correct information on the next batch of SSDDs to be initiated.

Concurrently with the SSDD 10 initiation, the professional licensing organization initiates 230 authenticated vendor identification information on the RWD(s) 20 issued to approved vendor(s) of continuing education. The code or other designation of authenticity is recognizable by the SSDD(s) 10 issued to practitioners. The vendor maintains a master set of course data on its IU 90 and populates 240 the RWDs 20 with approved course information. Portability of the course information is facilitated by placing it on the easily portable RWD 20.

Once the SSDD 10 and RWD 20 are issued, a periodic cycle of continuing education attendance begins. The practitioner may attend one or a plurality of courses of study, offered at various locations or electronically, by various vendors. To register attendance, the practitioner submits her SSDD 10 to interaction with the vendors RWD 20, by whatever method is enabled (mechanical, electronic or indirect). Through an exchange of information, the RWD 20 is able to confirm the practitioner's identity and her authenticated standing and the SSDD 10 is able to confirm the vendor's identity and authenticated status as approved by the professional licensing organization. If the SSDD 10 is a multiple application SSDD and if payment and loyalty applications are included on the SSDD 10, (see FIG. 7) the practitioner can also pay for the course using the SSDD 10 and get loyalty points for the payment, which would be stored on the SSDD 10.

Contingent upon identity and approval confirmation, authorization 260 is given for writing 270 course attendance information from the RWD 20 to the SSDD 10, as well as the transfer of practitioner-specific data from the SSDD 10 to the RWD 20. If the RWD 20 were populated only with a specific set of course data, the information collected from various SSDDs for that course will later be transferred 275 from the RWD 20 to the IU 90, to free storage space on the RWD 20 for a new set of course specific information.

The cycle of interaction between SSDDs 10 and RWDs 20 may be repeated many times during the cycle of continuing education attendance. The cycle lasts for a period specified by the professional licensing organization, typically a year. The result is SSDDs 10, each encoded with course attendance information from one or a plurality of education courses and RWDs 20 and IUs 90, encoded with practitioner-specific data concerning the courses that the practitioners attended.

As illustrated by FIG. 4B, at the end of the cycle, the practitioners each transmit 280 the encoded information on the SSDDs 10, either by physically returning the SSDDs 10 to the professional licensing organization to be read by the professional licensing organization's RWD 30 and uploaded to the PES 40 or by the practitioners uploading the information themselves to the PES 40 through the practioner's IU 80. Likewise, vendors submit 290 their accumulated information by uploading the information to the PES 40 using the vendor's IU 90. The professional licensing organization completes the cycle by performing compliance 300 and auditing 310 functions on the information submitted. The professional licensing organization may also processes some collected data for redistribution to vendors.

2. System Software

Figure 5A:
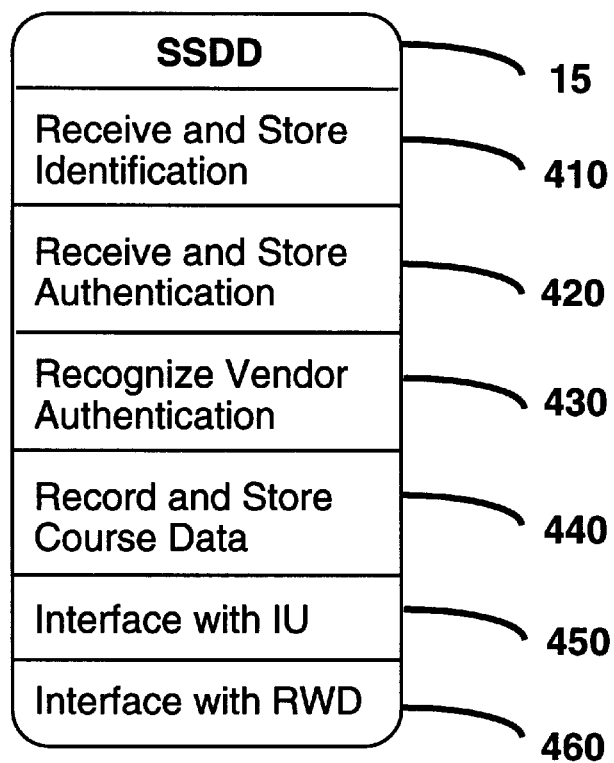
FIGS. 5A, 5B, and 5C are block diagrams illustrating the software components of the system elements of a continuing education reporting system in accordance with a preferred embodiment of the present invention.
Figure 5A:
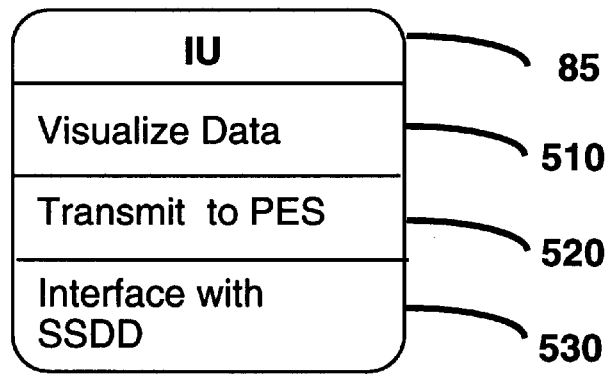
Figure 5B:
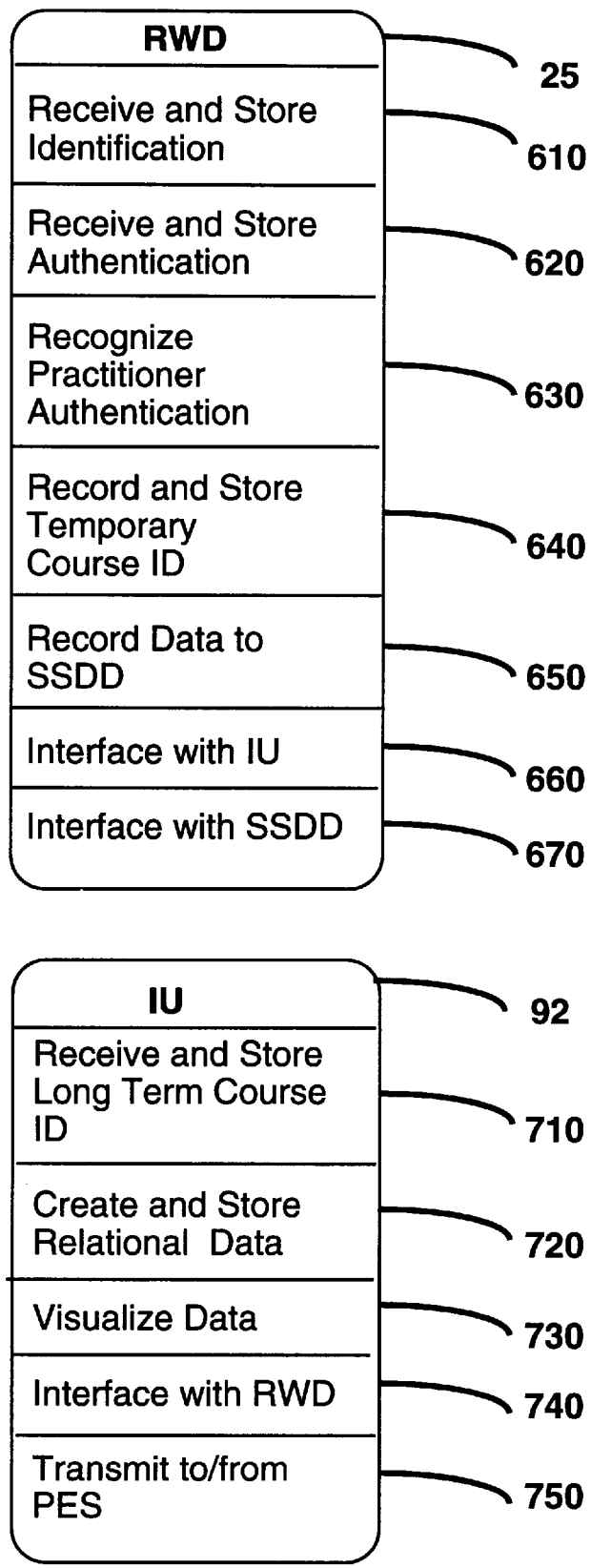
Figure 5C:
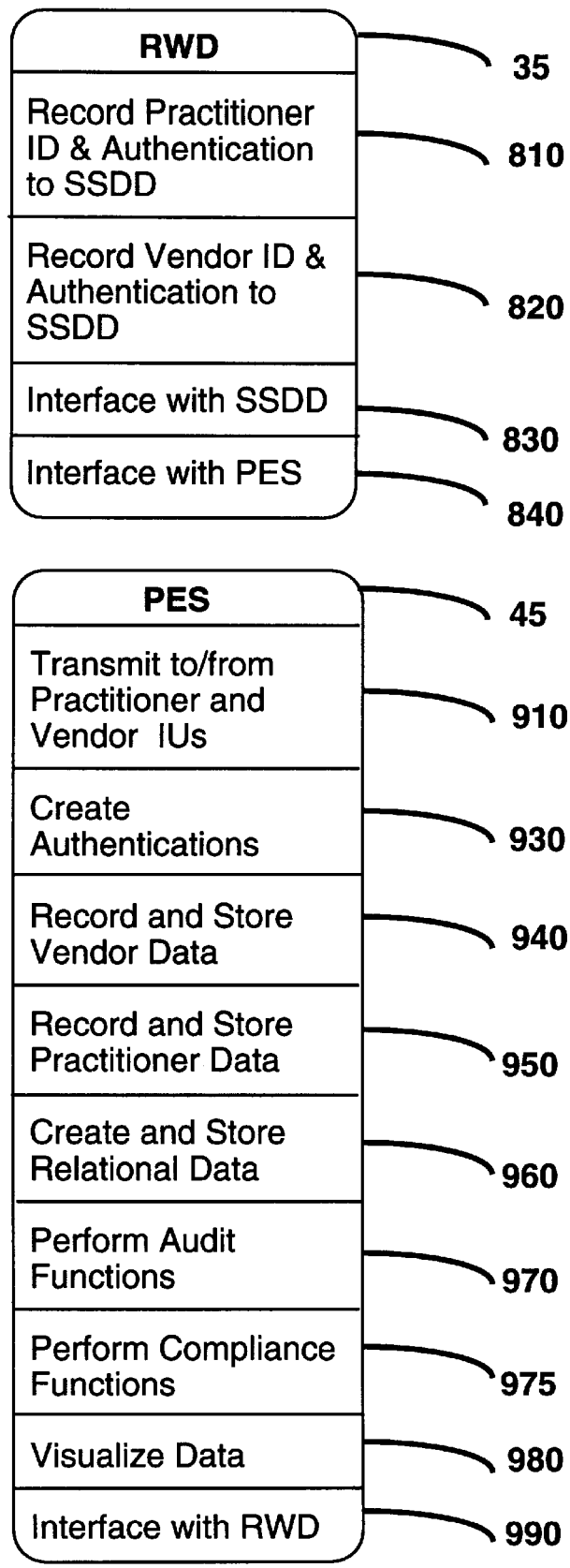

FIGS. 5A, 5B, and 5C are block diagrams illustrating the software components of the system elements of a continuing education reporting system in accordance with the present invention. As illustrated in FIG. 5A, the SSDD 10 software 15 receives and stores practitioner-specific data, including identification 410 and authentication of standing 420, received from RWD 30 and RWD software 25.

The SSDD 10 also has vendor authentication recognition software 430 to ensure the vendor is authorized by the professional licensing organization. If the vendor's status is not authenticated, the transaction will be rejected.

The SSDD 10 also has software and storage 440 for recording and storing course attendance information received from the RWD 20.

In addition, the SSDD 10 has a first SSDD-IU software interface 450 for communication with the first IU 80 and a SSDD-RWD software interface 460 for communicating with the RWDs 20, 30.

As illustrated in FIG. 5A, the first IU software 85 of the first IU 80 has data visualization software for displaying data on the display device 50, a IU-SSDD interface 530 for communicating with the SSDD 10 and a first IU-PES interface 520 for communication with the PES 40.

As illustrated in FIG. 5B, the first RWD 20 has first RWD software 25, which includes software for receiving and storing identification 610 of the vendor, and authentication 620 of the status of the vendor received from the second RWD 30. The first RWD software 25 also has verification software 630 to verify the identity of the practitioner by comparing the identity verification input to the identity information stored on the SSDD 10. The verification software 630 also recognizes the authenticated standing information of the practitioner stored in the SSDD 10. If the identity of the practitioner is not confirmed or if the standing information of the practitioner is not authenticated, the transaction will be rejected. Further, the first RWD software 25 has storage area 640, which may be temporary storage, for course identification information such as course name, course number, course category. The first RWD software 25 includes data recording software 650 for recording information such as course attendance information to SSDD 10 and its course attendance information storage 440. The first RWD 25 also includes RWD-IU interface software 660 for communication with the second IU 90. And the first RWD software 25 includes a SSDD interface 670 to communicate with the SSDD 10.

As illustrated in FIG. 5B, the second IU 90 has second IU software 95 which includes long term data storage 710. The second IU software 95 includes data visualization software 730 to display data on the second display device 70. The second IU software 95 also includes relational storage area 720 to maintain cross-referenced data, such as practitioners who attend more than one course offered by the same vendor or pracitioners with specialties who attend vendor courses concerning those specialties. The second IU software 95 also includes an IU-RWD interface 740 to allow communication with the RWD 20 and an IU-PES interface 750 for communication with the PES 40.

As illustrated in FIG. 5C, the second RWD 30 has second RWD software 35, which includes third information software 810 which records the practitioner-specific data used to initiate the SSDD 10. A fourth information handling software 820 records authenication and identification of the vendors to the first RWDs 20. The second RWD software 35 also includes a second RWD-SSDD interface 820 for communication with the SSDD 10 and a RWD-PES interface 830 to permit communication between the second RWD 30 and the PES 40.

As illustrated in FIG. 5C, the PES 40 has the PES software 45 which includes a PES-IU interface 910 for communication with the first and second IUs 80, 90. The PES software 45 also includes authentication software 930 to create and store authentications, which are transferred via RWD 30 to the SSDD 10 and RWD 20. The PES software 45 also includes vendor storage 940 to store data received at the end of the cycle from vendors, and practitioner information storage 950 to store data received at the end of the cycle from practitioners. The PES software 45 also includes an audit function 970 and a compliance function 975 further described in the next section. The PES software 45 also includes relational storage 960 which maintains a cross-reference of data from the practitioners and from the vendors. The PES software 45 also includes data visualization 980 for displaying information and creating reports. The PES software 45 also includes a PES-RWD interface 990 for communication with the RWDs 20, 30.

3. Audit and Compliance Functions

Figure 6A:
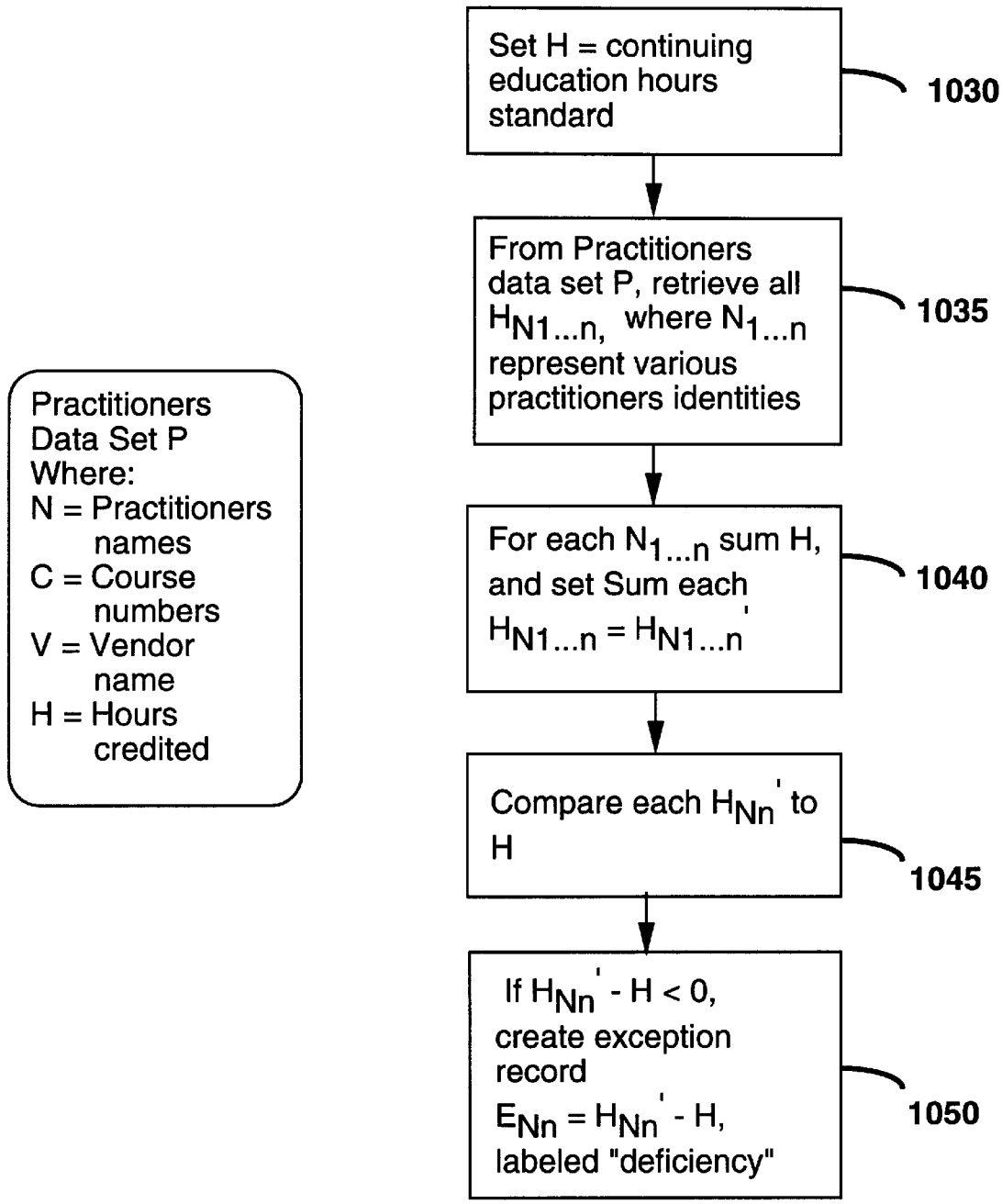
FIGS. 6A and 6B are flowcharts illustrating embodiments of software used to perform compliance and auditing of data in accordance with a preferred embodiment of the present invention.
Figure 6B:
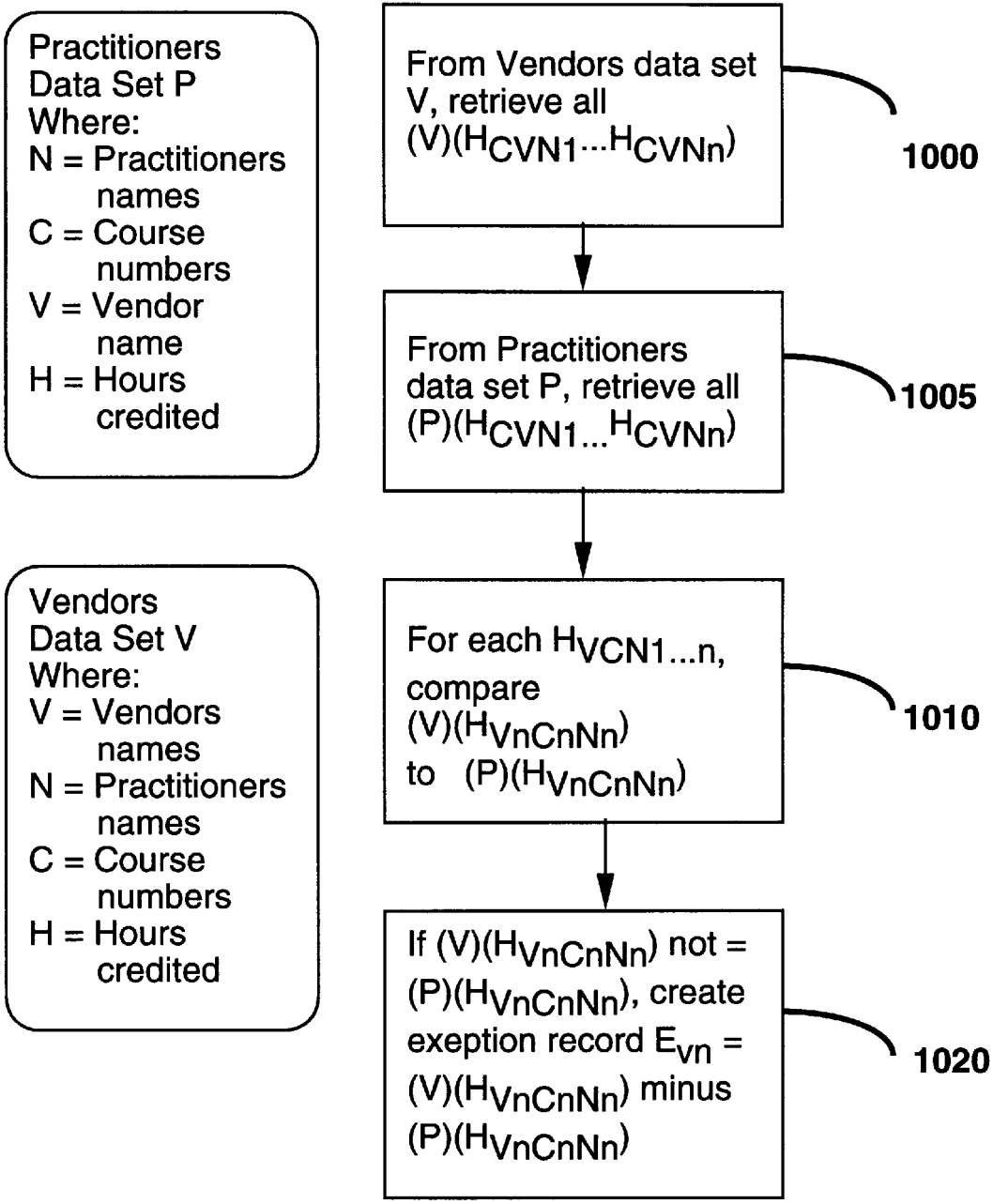

FIGS. 6A and 6B illustrate flowcharts for a software embodiment of the audit and compliance functions 970, 975 respectively, of the system resident in the PES 40.

As illustrated in FIG. 6B, the audit function 970 is performed by comparing data from the Practitioner's data set to the Vendor's data set. The Practitioner's data set is course attendance information for the practitioners which was received by the PES 40 from the practitioners. The Practitioner's data set comprises the practitioner's names $N_n$, the practitioner's attended course numbers $C_{N1} \ldots C_{Nn}$, the vendor name for each course $V_{CN1} \ldots V_{CNn}$, and the hours credited for each course $H_{CVN1}$ to $H_{CVNn}$. The Vendor's data set is course attendance information for the practitioners which was received by the PES 40 from the vendors. The Vendor's data set for each vendor $V_n$ include course numbers $C_1$ through $C_n$, practitioner's names $N_{C1}$ through $N_{Cn}$, and hours credited $H_{CVN1}$ to $H_{CVNn}$. The audit function retrieves 1000 all $H_{CVN1}$ from the Vendor's data set $[H_{CVN1}{}^V]$ and retrieves 1005 all $H_{CVN1}$ from the Practitioner's data set. The audit function compares 1010 $H_{CVN1}$ from the Practitioner's data set $[H_{CVN1}{}^P]$ to $H_{CVN1}$ from the Vendor's data set $[H_{CVN1}{}^V]$. If $H_{CVN1}{}^P$ equals $H_{CVN1}{}^V$, no exception is noted. If $H_{CVN1}{}^P$ does not equal $H_{CVN1}{}^V$, an exception $E_{Vn}$ is created 1020 such that $E_{Vn}$ is equal to $H_{CVN1}{}^P$ minus $H_{CVN1}{}^V$. The professional licensing organization is notified so that it can perform necessary follow-up.

For the compliance function 975, a discrete integer H is recorded 1030 in the software, representing the professional licensing organization's periodic education requirement in hours. The compliance function 975 accesses a database containing course attendance information submitted by the practitioner. In an alternative embodiment, the records containing course attendance information submitted by the vendor are accessed. The course attendance information in the database includes the practitioner's name N, the practitioner's attended course numbers $C_{N1} \ldots C_{Nn}$, the vendor name for each course $V_{CN1} \ldots V_{CNn}$, and the hours credited for each course $H_{CVN1}$ to $H_{CVNn}$. For each practitioner $N_1$ to $N_n$, the $H_{CVN}$ are retrieved 1035 and summarized 1040, and the value set to H'. The compliance function compares 1045 H' to H. If H' is greater than or equal to H, no exception is noted. If H' is less than H, an exception record $E_{Nn}$ is created 1050, such that $E_{Nn}$ is equal to H minus H'. This record is labeled "deficiency" for practitioner $N_n$.

4. A Multi-Application Embodiment

Figure 7:
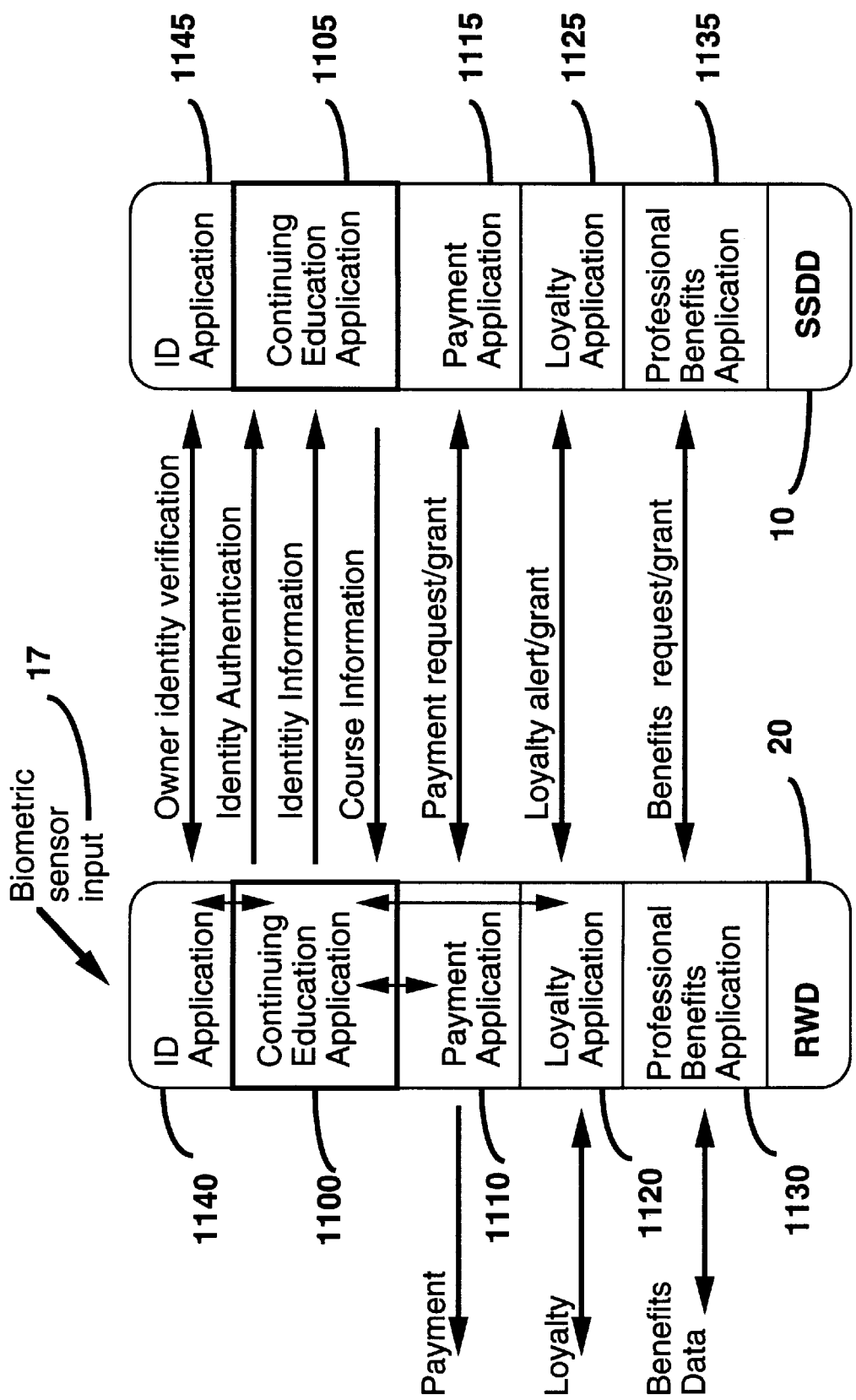
FIG. 7 is a block diagram illustrating a continuing education reporting system integrated on a multiapplication SSDD and a multiapplication RWD, in accordance with a preferred embodiment of the present invention.

FIG. 7 illustrates a system for tracking continuing education 1100, along with other applications on a multiple application SSDD 10. Each application would have its own software and data storage on the SSDD 10 and on the RWD 20. As an alternative to having application software and data storage on the RWD 20, some or all of it could be on the network or available through the PES or other servers. Applications illustrated as being on the SSDD 10 in the embodiment illustrated in FIG. 7 are the tracking continuing education application 1100, an identity application 1140, a payment application 1110, a loyalty application 1120 and a professional benefits application 1130. Each application has corresponding software and data storage on the RWD 20: the tracking continuing education application 1105, an identity application 1145, a payment application 1115, a loyalty application 1125 and a professional benefits application 1135. The identity application 1140, 1145 would allow the SSDD 10 to act as an identity verification for the practitioner, not only for purposes of the continung education application, but for other applications on the card as well. The payment application 1110, 1115 would allow the SSDD 10 to act as a credit, debit or stored value card. Payment requests and grants could be communicated from the RWD 20 to the SSDD 10 and visa versa. The loyalty application 1120, 1125 could allow the practitioner to accumulate loyalty bonuses, such as frequent flyer miles or discounts on the SSDD 10. Loyalty alerts and grants could be communicated between the RWD 20 to the SSDD 10. Loyalty points could be stored and accumulated on the SSDD 10. The professional benefits application 1130, 1135 could indicate the practitioner's eligibility for certain services, such as insurance, or other professional benefits obtained through the professional licensing organization. Providers of such benefits could use an RWD to verify the practitioner's status.

In operation the invention provides for a system of tracking continuing education information by using SSDDs, RWDs and a PES to verify the identity of the practitioner, verify the certification of the vendor, store information concerning course attendance information, audit discrepancies between data offered by vendors and that offered by participants and verify compliance with continuing education requirements.

The benefits of the present invention include that it provides for a system and a method of automatically tracking continuing education which does not rely on paper record-keeping.

Another benefit of the present invention is that it provides for a system and a method of automatically tracking continuing education, while minimizing error arising from manual entry of data.

Another benefit of the present invention is that it provides for a system and a method of automatically tracking continuing education which will also authenticate the identity of the practitioner attending the course of study.

Another benefit of the present invention is that it provides for a system and a method of automatically tracking continuing education which will transmit the data to the professional licensing organization in a form that facilitates its use.

Another benefit of the present invention is that it provides for a vendor data recording and storage mechanism capable of authenticating the practitioner's identity, of collecting data that meets the professional licensing organization's requirements and of transmitting the data to the professional licensing organization.

Another benefit of the present invention is that it provides for a system and a method of automatically tracking continuing education which does not place a burden on the practitioner, but protects the privacy of the practitioner.

Another benefit of the present invention is that it provides for a system and a method of automatically tracking continuing education which prohibits tampering with recorded data.

Another benefit of the present invention is that it provides for a system and a method of automatically tracking continuing education which identifies exceptions to compliance with the professional licensing organization's education requirements.

Another benefit of the present invention is that it provides for a system and a method of automatically tracking continuing education which identifies exceptions to data consistency between practitioner's data and vendor's data.

Another benefit of the present invention is that it provides for a system and a method of automatically tracking continuing education which can maintain individualized real time data of geographically dispersed practitioners and vendors.

Another benefit of the present invention is that it provides for a system and a method of automatically tracking continuing education which can accumulate data on frequency of course attendance within licensing jurisdictions in order to plan future course offerings.

The principles, preferred embodiments, and modes of operation of the present invention have been described in the foregoing specification. The invention is not to be construed as limited to the particular forms disclosed, because these are regarded as illustrative rather than restrictive. Moreover, variations and changes may be made by those skilled in the art without departing from the spirit of the invention.

What is claimed is:

1. A system for tracking continuing education for a practitioner comprising:

a secure stored data device (SSDD) having practitioner-specific data written on the SSDD;

a first read/write device (RWD) for communicating with the SSDD and for writing course attendance information to the SSDD; and a continuing education server (PES);

wherein the RWD is initialized with authenticated vendor information from the PES to show that the vendor is authorized by a professional licensing organization to provide continuing education courses;

wherein the RWD is populated with approved course information; and wherein the SSDD is operable to obtain certification information from the RWD and is operable to confirm that continuing education courses are certified by a professional licensing organization.

2. A system as in claim 1, wherein:

the SSDD is a smart card.

3. A system as in claim 1, wherein:

the smart card is a multi-application smart card.

4. A system as in claim 1, wherein the continuing education server (PES) has a means to receive and accumulate the continuing education information from the SSDD and from the first RWD.

5. A system as in claim 4, further comprising:

a second RWD associated with the PES which can communicate with the SSDD.

6. A system as in claim 5, further comprising:

a first interface unit (IU) having a third RWD for communicating with the SSDD, having a first display device and having means to compile continuing education reports and display the continuing education reports on the first display device; and a second IU which communicates with the first RWD, having a second display device and having means to compile continuing education reports and display the continuing education reports on the second display device.

7. A system as in claim 5, wherein:

the PES has means to compare course attendance information received from the first RWD to course attendance information received from the SSDD to determine whether there are any inconsistencies.

8. A system as in claim 5, wherein:

the PES has means to analyze course attendance information for the practitioner to determine whether the practitioner has met course education requirements of a professional licensing organization.

9. A system as in claim 6, wherein:

the first IU has means to communicate with the PES: and the second IU has means to communicate with the PES.

10. A system as in claim 4, further comprising:

an identity verification input communicating with the first RWD; and wherein:

the practitioner-specific information includes identity verification information.

11. A system as in claim 10, wherein:

the identity verification information includes a password.

12. A system as in claim 10, wherein:

the identity verification information includes a personal identification number (PIN).

13. A system as in claim 10, wherein:

the identity verification information includes a digitized signature.

14. A system as in claim 13, wherein:

the digitized biometric information is a digitized retinal pattern.

15. A system as in claim 10, wherein:

the identity verification information includes digitized biometric information.

16. A system as in claim 15, wherein:

the digitized biometric information is a digitized fingerprint.

17. A system for tracking continuing education of a practitioner comprising:

a secure stored data device (SSDD) having practitioner-specific data written on the SSDD, the practitioner-specific data including identity verification information and good standing information;

a first read/write device (RWD) of a vendor for communicating with the SSDD, for writing course attendance information to the SSDD, the first RWD having an identity verification input and having approved course information including information indicating that the vendor is authorized by a professional licensing organization to provide continuing education courses;

a continuing education server (PES) having means to receive and accumulate the practitioner's continuing education information obtained from the SSDD and from the first RWD and having a second RWD which can communicate with the SSDD; and a first interface unit (IU) having a third RWD for communicating with the SSDD, having a first display device and having means to compile continuing education reports and display the continuing education reports on the first display device, and having a means to communicate with the PES; and a second IU which communicates with the first RWD, having a second display device and having means to compile continuing education reports and display the continuing education reports on the second display device, having a means to communicate with the PES;

wherein the RWD obtains the information indicating that the vendor is authorized by a professional licensing organization to provide continuing education courses and approved course information from the PES.

18. A system as in claim 17, wherein:

the PES has means to analyze the course attendance information for the practitioner to determine whether the practitioner has met the course education requirements of the professional licensing organization.

19. A system as in claim 18, wherein:

the PES has means to compare course attendance information received from the first RWD to course attendance information received from the SSDD to determine whether there are any inconsistencies.

20. A system as in claim 17, wherein:

the SSDD is a smart card.

21. A system as in claim 20, wherein:

the smart card is a multi-application smart card.

22. A system as in claim 21, wherein:

an application on the card is a loyalty application.

23. A system as in claim 21, wherein:

an application on the card is a payment application.

24. A system as in claim 21, wherein:

an application on the card is a professional benefits application.

25. A method for tracking continuing education for a practitioner comprising:

initiating a first read/write device (RWD) of a vendor using a continuing education server (PES), with authenticated vendor information to show that the vendor is authorized by a professional licensing organization to provide continuing education courses;

initiating a secure stored data device (SSDD) with practitioner-specific information using a second RWD associated with the PES and authenticating the SSDD;

populating the first RWD with approved course information;

submitting the SSDD to the first RWD;

obtaining authorization to write course attendance information from the RWD to the SSDD, including:

obtaining appropriate practitioner input into an identity verification unit of the first RWD;

reading the practitioner input with the first RWD and reading practitioner-specific information from the SSDD with the first RWD;

comparing the practitioner input to the practitioner-specific information using the first RWD, to confirm the identity of the practitioner;

confirming that the continuing education course is certified by the professional licensing organization by using the SSDD to obtain certification information from the first RWD; and confirming that the practitioner is in good standing with the professional licensing organization by using the first RWD to obtain certification from the SSDD;

writing course attendance information for the practitioner to the SSDD using the first RWD;

storing course attendance information for a practitioner on the first RWD and transmitting the course attendance information from the first RWD to a PES;

transferring course attendance information for a practitioner from the SSDD to a PES through the second RWD associated with the PES;

using the PES to analyze course attendance information for the practitioner to determine whether the practitioner has complied with continuing education requirements of the professional licensing organization; and analyzing course attendance information received from the SSDD and course attendance information for the practitioner received from the first RWD using the PES to determine whether there are any inconsistencies.

26. The method of claim 25, wherein, the SSDD is a multi-application smart card and further comprising;

writing loyalty points to the smart card.

27. The method of claim 25, wherein, the SSDD is a multi-application smart card and further comprising;

using the smart card to make a payment.

28. The method of claim 25, wherein, the SSDD is a multi-application smart card and further comprising;

ascertaining the practitioner's eligibility for professional benefits from the smart card.

* * * * *